US012692437B2

(12) United States Patent
Bao

(10) Patent No.: US 12,692,437 B2
(45) Date of Patent: Jul. 28, 2026

(54) HEAT TREATMENT OF NANODIAMOND PARTICLES WITH CONTROLLED POWDER LAYER DEPTH

(71) Applicant: SCHLUMBERGER TECHNOLOGY CORPORATION, Sugar Land, TX (US)

(72) Inventor: Yahua Bao, Provo, UT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/848,658

(22) PCT Filed: Jun. 15, 2023

(86) PCT No.: PCT/US2023/068505
§ 371 (c)(1),
(2) Date: Sep. 19, 2024

(87) PCT Pub. No.: WO2023/245112
PCT Pub. Date: Dec. 21, 2023

(65) Prior Publication Data
US 2025/0215313 A1 Jul. 3, 2025

Related U.S. Application Data

(60) Provisional application No. 63/366,439, filed on Jun. 15, 2022.

(51) Int. Cl.
C09K 11/65 (2006.01)
B01J 3/06 (2006.01)
(Continued)

(52) U.S. Cl.
CPC .............. *C09K 11/65* (2013.01); *B01J 3/062* (2013.01); *C01B 32/28* (2017.08); *C03C 17/22* (2013.01);
(Continued)

(58) Field of Classification Search
CPC ................ C03C 17/22; C03C 2218/32; C03C 2218/111; C03C 2218/116;
(Continued)

(56) References Cited

U.S. PATENT DOCUMENTS 10,287,495 B1    5/2019  Shenderova
10,370,252 B1 *  8/2019  Pope, II ................. C30B 29/04
(Continued)

FOREIGN PATENT DOCUMENTS

CN        110230044      *  9/2019
RU        20145365       *  2/2000
(Continued)

OTHER PUBLICATIONS

Li, L. et al., Focusing on luminescent graphene quantum dots: current status and future perspectives, Nanoscale, 5, 2013, pp. 4015-4039, RSC Publishing.

*Primary Examiner* — Katherine A Bareford
(74) *Attorney, Agent, or Firm* — Kyle R. Miiller

(57) ABSTRACT
Luminescent diamond is made by creating vacancies in diamond grains and heat treating the diamond grains by controlling a thickness of the diamond grains on a substrate. The heat treatment may occur in a temperature range that does not burn the diamond grains, and the controlled thickness produces an even color change and/or promotes oxygen terminations on the diamond particle surfaces.

22 Claims, 2 Drawing Sheets

(51) Int. Cl.
 *C01B 32/28* (2017.01)
 *C03C 17/22* (2006.01)

(52) U.S. Cl.
 CPC ................... *B01J 2203/0655* (2013.01); *B01J 2203/0695* (2013.01); *C01P 2006/60* (2013.01); *C03C 2217/42* (2013.01); *C03C 2217/70* (2013.01); *C03C 2218/111* (2013.01); *C03C 2218/116* (2013.01); *C03C 2218/32* (2013.01)

(58) Field of Classification Search
 CPC .. C03C 2217/42; C03C 2217/70; B01J 3/062; B01J 2203/0655; B01J 2203/062; B01J 2203/0695; C01B 32/28; C09K 11/65; C30B 33/02; C30B 29/04; C01P 2006/60

See application file for complete search history.

(56) References Cited

U.S. PATENT DOCUMENTS

| | | | |
|---|---|---|---|
| 2005/0196547 A1* | 9/2005 | Park | C01B 32/28 |
| | | | 427/532 |
| 2005/0260935 A1* | 11/2005 | Anthony | B01J 3/062 |
| | | | 451/53 |
| 2008/0118966 A1* | 5/2008 | Chang | C01B 32/28 |
| | | | 204/157.44 |
| 2010/0068503 A1* | 3/2010 | Neogi | C04B 41/0036 |
| | | | 427/337 |
| 2016/0233825 A1* | 8/2016 | Bertelo | C09D 7/65 |
| 2022/0056337 A1 | 2/2022 | Belnap | |
| 2023/0257648 A1 | 8/2023 | Bao | |

FOREIGN PATENT DOCUMENTS

| | | | |
|---|---|---|---|
| RU | 2504802 C1 * | 1/2014 | |
| WO | 2020/150341 * | 7/2020 | |
| WO | 2023107602 A2 | 6/2023 | |
| WO | 2023230329 A1 | 11/2023 | |

* cited by examiner

HEAT TREATMENT OF NANODIAMOND PARTICLES WITH CONTROLLED POWDER LAYER DEPTH

CROSS-REFERENCE TO RELATED APPLICATIONS

This application is a National Stage entry of International Patent Application No. PCT/US2023/068505, filed on Jun. 15, 2023, which claims the benefit of U.S. Provisional Application No. 63/366,439, entitled "HEAT TREATMENT OF NANODIAMOND PARTICLES WITH CONTROLLED POWDER LAYER DEPTH," filed Jun. 15, 2022, the disclosure of which is hereby incorporated herein by reference.

BACKGROUND

Laser-infused fluorescence is a known technique adopted for better understanding how biological systems function at a cellular, sub-cellular, or molecular level through the probing of tissues, cells, and biomolecules individually for observation. In an example, laser-infused fluorescence may be applied to image and track a single molecule or particle in a biological cell or the like, e.g., in-vivo biological sensors for internal organ mapping, cell imaging, and the like. One type of substance used for laser-infused fluorescence is luminescent nanodiamond, which is nano-sized diamond particles or grains that has been developed to emit light when excited by a light source within a desired wavelength as called for by the end-use application.

BRIEF DESCRIPTION OF THE DRAWINGS

These and other features and aspects of luminescent nanodiamond and methods of making the same as disclosed herein will be appreciated as the same becomes better understood by reference to the following detailed description when considered in connection with the accompanying drawings where:

FIG. 1-2 is a photograph of the nanodiamond particles of FIG. 1-1 when coated on the glass slide after a heat treatment;

FIG. 2 shows a layer thickness measurement of diamond nanoparticles before a heat treatment, using a 3D image method.

DETAILED DESCRIPTION

Figure 1:
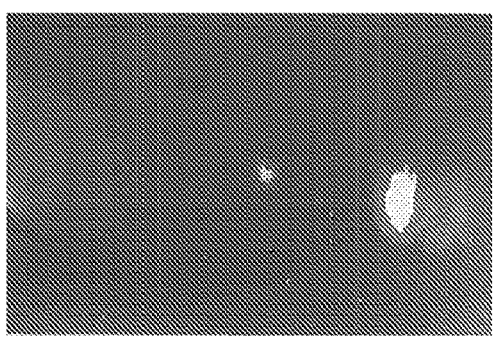
FIG. 1-1 is a photograph of nanodiamond particles coated on a glass slide before a heat treatment.

Some embodiments of the present disclosure relate to luminescent diamond, which may also be referred to as photoluminescent diamond. In some additional embodiments, methods and devices are described which are useful for producing luminescent diamond, including producing diamond pellets having an enhanced degree of plastic deformation and an increased amount of vacancy centers (nitrogen, silicon, etc.). The increase in vacancy centers can produce an increased degree of luminescence in one or more spectra. For instance, the increased luminescence may occur in one or more of: red, blue, green, or violet visible wavelength spectra; ultraviolet spectra; infrared spectra; or near-infrared spectra.

In some embodiments, luminescent diamond (e.g., photoluminescent diamond) and methods for making the same as disclosed herein is engineered in a manner that increases manufacturing efficiency and manufacturing volume to thereby improve affordability and availability of the substance for end-use applications including and not limited to the biological uses. Luminescent diamond may in such embodiments be produced with less expense, energy, time, or any combination thereof, potentially increasing the availability of such luminescent diamond.

Further, in some embodiments, luminescent diamond as prepared in accordance with the principles disclosed herein display a level of luminescence intensity that is similar to or greater than that of conventional luminescent diamond, thereby presenting an opportunity for expanding the range of potential end-use applications for such material. For purposes of clarity, in some embodiments luminescent diamond of some embodiments herein is formed initially by consolidation and compaction of pre-existing diamond grains, forming a luminescent active sintered body or slug (characterized by a high degree of intercrystalline diamond bonding), or forming a mechanically combined semi-sintered body or slug (characterized by a lesser degree or substantially no intercrystalline diamond bonding). In such condition, the consolidated material is referred to herein as luminescent diamond. During subsequent processing, the luminescent diamond may be heat treated and/or reduced in size as called for by a particular end use, and in some embodiments, the resulting diamond particles or grains may be nano-scale in size. In some instances, the reduced sized luminescent diamond may be exclusively nano-size particles, or may include a combination of nano-size particles with coarser diamond particles. The term "nanodiamond" as used herein is understood to refer to luminescent diamond including nano-size diamond particles, e.g., having an average size up to 1000 nm (e.g., between 1 nm and 1000 nm).

In some embodiments, luminescent diamond as disclosed herein may be formed by combining a volume of precursor diamond grains, which may be in the form of natural and/or synthetic diamond grains, and placing the volume of diamond grains into a cell, can, or container as conventionally used for diamond grain consolidation. In an example, the diamond grains may have an average grain size from 1 μm to 1000 μm, from 1 μm to 100 μm, or from 10 μm to 50 μm. In other embodiments, the initial diamond grain or powder sizes may extend into the submicron or nanodiamond range, as described herein. In some embodiments, nanosized powders formed either by mechanical crushing of conventional diamond powders or detonation processes can be employed in a similar manner. The conventional diamond powders can either be of synthetic or natural origin; however, in some cases, synthetic diamond powder has a higher intrinsic nitrogen content which along with an adjacent vacancy center makes the diamond luminescent active. In an example, the starting diamond material has an intrinsic amount of nitrogen impurity that is consistent with that found in diamond designated as type 1b, (e.g., 50 ppm nitrogen or higher). Nanosized powders synthesized through shock synthesis can have higher intrinsic nitrogen content as well.

In example embodiments, the cell, can, or container (each a cell or pressure cell) is specially configured to impose a differential or asymmetric pressure, e.g., an axial pressure that is different than a radial direction, onto its contents when subjected to a high-pressure/high-temperature (HPHT) consolidation process using conventional press equipment for making polycrystalline diamond. The systems and methods for making luminescent diamond with differential or asymmetric pressure as described in International Patent Application PCT/US2022/052223 is hereby incorporated by reference in its entirety for all purposes. As described in greater detail herein, the differential pressure imposed by the cell as disclosed herein can cause a greater degree of plastic deformation to occur and thereby produce a greater number of nitrogen vacancy centers useful to increase the amount of defects/optical centers (e.g., NV, NVN, or N3 in the case of nitrogen defects) formed in the resulting luminescent diamond pellets, and to correspondingly increase the amount of luminescence. In example embodiments, the press equipment or apparatus used to impose pressure on the cell, can, or container may be specially configured to impose a differential or asymmetric pressure (e.g., an axial pressure that is different than a radial pressure) onto the cell and the contents within the cell when subjected to a HPHT consolidation process using such specially configured press equipment for making polycrystalline diamond. As described in greater detail herein, the differential pressure imposed by the press equipment as disclosed herein can cause a greater degree of plastic deformation to occur and thus produce a greater number of vacancy centers useful to increase the amount of centers formed in the resulting luminescent diamond pellets to increase the amount of luminescence.

As discussed herein, luminescent diamond may be heat treated and/or reduced in size as called for by a particular end use. According to some aspects, the heat treatment or other processing may be used to provide desirable surface characteristics that may be beneficial for an end use. For instance, luminescent nanodiamond can be used as biomaterials as drug delivery carriers, bioimaging materials, etc., and heat treatments may be used to provide different surface terminations.

According to some aspects, heat treatment can occur in air below 550° C., which can facilitate having oxygen termination on the surface that affect optical properties of the luminescent diamond. In some embodiments, heat treatment in air at or below 550° C. or 650° C. can be critical to boosting nanodiamond photoluminescence intensity. Notably, however, it can also be difficult to uniformly treat nanodiamond particles inside a powder bed when the temperature is below 550° C. Moreover, if the temperature is too high, nanodiamond powder can burn out.

To facilitate heat treatment, a coating method is considered for application to control the powder layer depth during heat treatment processes. In an example embodiment, nanodiamond powder is dispersed into liquid. Dispersing the nanodiamond powder in this way can prepare a stable suspension. Particles can be well dispersed in a variety of liquid solvents, including water.

The suspension can then be coated onto a surface to form a nanodiamond layer. In some embodiments, the surface is a glass surface, although other materials that may withstand the temperature of the heat treatment may also be used. For instance, various metal and metal alloys, composites, ceramics, cermets, and other materials may be used.

Figures 1, 2:
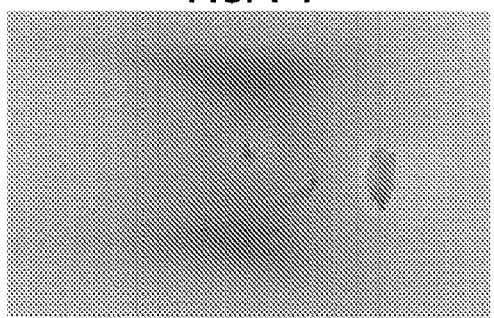
Figure 2:
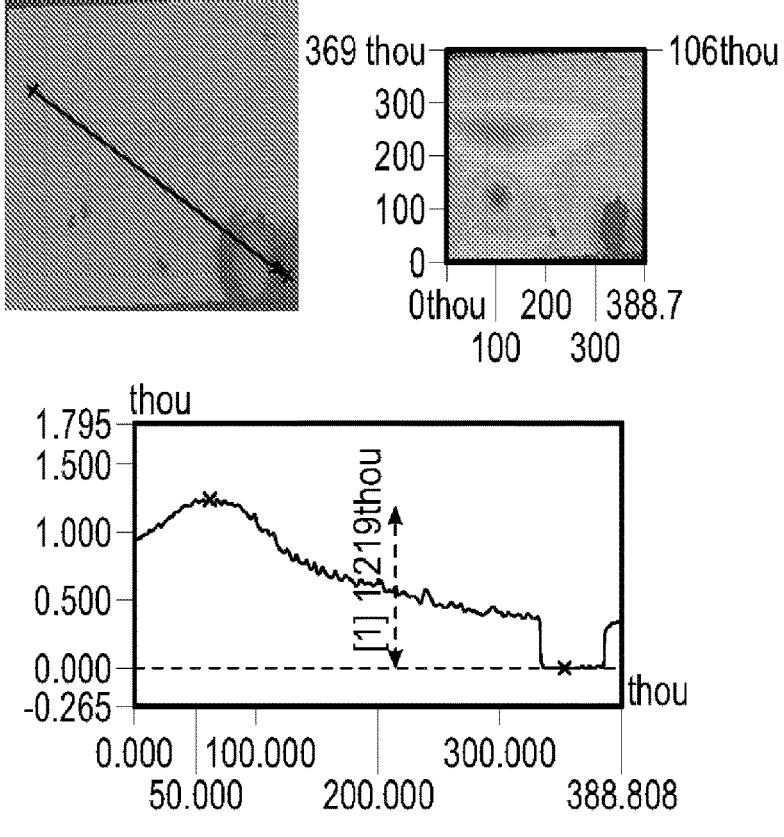

FIG. 1 (including FIGS. 1-1 and 1-2) illustrates an example embodiment when nanodiamond materials are coated on glass slides before and after heat treatment. In an example, after heat treatment in air at 450° C. to 550° C., for an hour, the diamond particle color can change, and the color can go from dark to a bright, milky color. In FIG. 1-1, the nanodiamond particles are coated before the heat treatment, and FIG. 1-2 shows the nanodiamond particles after heat treatment at 500° C. for an hour. As illustrated, the change in color can be significant. The lightening in color corresponds to increased oxygen termination of the diamond particles, thereby increasing the photoluminescent intensity.

The color change can also depend on factors other than temperature, duration of the heat treatment, and the substrate on which the materials are coated. For instance, the nanodiamond color after heat treatment can depend on the layer thickness. FIG. 2 shows the layer thickness measurement before heat treatment. Notably, when the layer thickness is ~13 μm, the diamond particles are all a bright, milky color after treatment. However, when the layer thickness increases to ~30 μm (as reflected by the ridge area), the diamond particles remain a darker color.

Any suitable method can be used for coating diamond nanoparticles on glass, ceramic, or other slides. Example methods can include dip coating, spin coating, dry coating, and slip casting. In at least some embodiments, the thickness coating is within a range having lower, upper, or lower and upper values that include 1 μm, 3 μm, 5 μm, 10 μm, 15 μm, 20 μm, 25 μm, and values therebetween. For instance, the thickness of the coating may be controlled to be at least 1 μm, not to exceed 25 μm, or in a range between 1 μm and 25 μm. In some embodiments, the layer is controlled to have a thickness between 3 μm and 15 μm, or between 5 μm and 15 μm. In at least some embodiments, a thickness below 15 μm or below 20 μm may be critical to obtaining a consistent color change.

The layer thickness may also depend on the heat treatment length and temperature. In general, the layer thickness may increase with heat treatment time, temperature, or both time and temperature. Decreasing the layer thickness may facilitate a shorter heat treatment time, a lower temperature, or both a shorter heat treatment time and a lower temperature.

In one or more embodiments, the method for coating a substrate includes dry coating, with a concentration of diamond particles between 0.1% to 10% by weight. It may, however, be difficult to get a uniform layer thickness due to surface tension of the water or other liquid holding the particles in suspension. In some embodiments, alcohol or another material that suppresses or lowers the surface tension of the suspension can be used. For instance, a nanodiamond suspension where the liquid is composed of 10% to 100% of a surface tension suppressant (e.g., alcohol) can spread well on a glass substrate. After placing the suspension on the substrate surface, it can be dried (e.g., air dried, oven dried, dried with a hot plate, etc.). Drying may occur at a temperature below the boiling point of the liquid for the suspension. After drying, the coating can be highly uniform. In the event some areas have a higher thickness (e.g., exceeding 25 μm or 30 μm), these areas can be scraped off before or after a heat treatment that promotes, among other things, oxygen termination on diamond particle surfaces.

Figure 3:
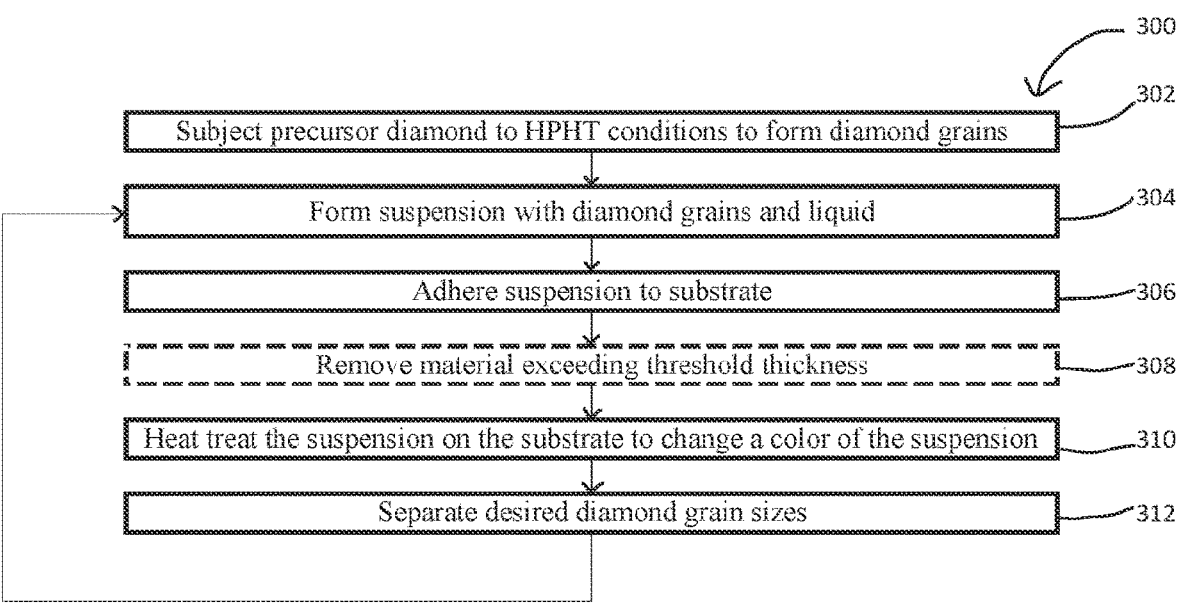
FIG. 3 shows a method of increasing photoluminescent properties of diamond nanoparticles through heat treatment.

FIG. 3 illustrates a method 300 of increasing photoluminescent properties of diamond nanoparticles through heat treatment. As discussed above, a volume of precursor diamond grains may be subjected (block 302) to a HPHT process in a pressure cell to form diamond grains with luminescent centers (e.g., NV, NVN, or N3 centers). In some embodiments, the HPHT process may be in the range of from about 1300 to 2500° C., and the process pressure may be from about 3.0 GPa to about 10 GPa. The resulting diamond grains may be separated into a powder, and combined (block 304) with a liquid to form a suspension. As discussed above, the liquid may include water, a surface tension suppressant (e.g., alcohol), or other liquids. The diamond grains may have a concentration between 0.1% to 10% by weight in the suspension. The suspension is adhered (block 306) to a substrate, such as a glass or ceramic. The suspension may be adhered by one or more of dip coating, spin coating, dry coating, or slip casting. The suspension and the substrate are heat treated (block 310) at a heat treatment temperature for a duration of time. In some embodiments, the heat treatment temperature is less than 650° C., 600° C., 550° C., 500° C., or 450° C. In some embodiments, the heat treatment temperature is greater than 400° C., greater than 450° C., or greater than 500° C., such as 525° C. The heat treatment duration may be between 30 to 300 minutes, between 30 to 120 minutes, between 45 to 90 minutes, or approximately 60 minutes. The one or more liquids of the suspension may evaporate prior to or during the heat treatment.

During the heat treatment, oxygen termination and/or vacancy formation may occur on the diamond grains disposed on the substrate. The heat treatment may change the color of the suspension on the substrate. For example, a dark, opaque or slightly translucent suspension prior to heat treatment may change to a light, transparent or more translucent suspension after the heat treatment. In some embodiments, the adhered suspension may change from a black, gray, or dark color to a yellow, light gray, white, or translucent suspension. Optionally, some of the diamond grains may be removed (block 308) from the substrate prior to or subsequent to the heat treatment (block 310). The diamond grains may be removed to facilitate a desired thickness of the diamond material on the substrate, such as less than 30 μm, less than 25 μm, less than 20 μm, less than 15 μm, or between 1 to 15 μm. Maintaining a thickness of the diamond material on the substrate less than approximately 15 μm may improve the yield of oxygen termination on the diamond grains.

After heat treatment at block 310, the diamond grains may be removed from the substrate and separated (block 312) into desired grain sizes. In some embodiments, part of the method 300 may be repeated with some or all of the removed diamond grains combined (block 304) with a liquid to form a suspension for subsequent adherence (block 306) to a substrate and heat treatment (block 310). In some embodiments, diamond grains may repeat the suspension and heat treatment process 3, 4, 6, 8, 10, 12, 15, or more times.

Although a few example embodiments of luminescent diamond have been described in detail above, those skilled in the art will readily appreciate that many modifications are possible in the example embodiments without materially departing from the scope of the claims and present disclosure. For example, luminescent diamond as disclosed herein has been presented in the context of a biological end-use application. It is to be understood that luminescent diamond as disclosed herein may be use in end-use applications other than biological where a desired improved level of luminescence intensity is useful or beneficial. Other potential uses of luminescent diamond (e.g., those containing nitrogen vacancy centers) include but are not limited to usage in magnetic sensors, high resolution thermography, microscopic sensor arrays, anti-counterfeiting measures, ion concentration monitoring, membrane potential measurement, optical trapping, and strain/pressure sensors. Therefore, it is understood that luminescent diamond as disclosed herein is not intended to be limited to one particular end use application.

In other embodiments, HPHT or heat treatment conditions are described, but are illustrative only as different conditions may be used. For instance, materials described herein may be formed using different press technologies, in the presence of different catalyst materials, suspended in different liquids, used with different surface tension suppressants, adhered to different substrates, heat treated in different atmospheres, treated at different temperatures or time periods, or varied in myriad manners. Thus, conditions may vary in different embodiments. The systems and methods for making luminescent diamond as described in U.S. Patent Application Publication US2022/0056337, U.S. patent application Ser. No. 18/005,115, and International Patent Application PCT/US2023/023697, each of which are herein incorporated by reference in their entirety for all purposes.

In the description herein, various relational terms may be used to facilitate an understanding of various aspects of some embodiments of the present disclosure. Relational terms such as "top," "bottom", "above," "below", "left", "right", and the like may be used to describe various components, including their operational or illustrated position relative to one or more other components. Relational terms do not indicate a particular orientation for each embodiment within the scope of the description or claims, but are intended for convenience in facilitating reference to various components. Thus, such relational aspects may be reversed, flipped, rotated, moved in space, placed in a diagonal orientation or position, placed horizontally or vertically, or similarly modified.

Certain descriptions or designations of components as "first," "second," "third," and the like are can be used in the description or claims to differentiate between identical components or between components which are similar in use, structure, or operation. Such language is not intended to limit a component to a singular designation or require multiple components. As such, a component referenced in the specification as the "first" component may be the same or different than a component that is referenced in the claims as a "first" component, and a claim may include a "first" component without requiring the existence of a "second" component.

Furthermore, while the description or claims may refer to "an additional" or "other" element, feature, aspect, component, or the like, it does not preclude there being a single element, or more than one, of the additional element. Where the claims or description refer to "a" or "an" element, such reference is not be construed to that there is just one of that element, but is instead to be inclusive of other components and understood as "at least one" of the element. It is to be understood that where the specification states that a component, feature, structure, function, or characteristic "may," "might," "can," or "could" be included, that particular component, feature, structure, or characteristic is provided in certain embodiments, but is optional for other embodiments of the present disclosure. The terms "couple," "coupled," "connect," "connection," "connected," "in connection with," and "connecting" refer to "in direct connection with," or "in connection with via one or more intermediate elements or members." Components that are "integral" or "integrally" formed include components made from the same piece of material, or sets of materials, such as by being commonly molded or cast from the same material, in the same molding or casting process, or commonly machined from the same piece of material stock. Components that are "integral" should also be understood to be "coupled" together.

Additionally, it should be understood that references to "one embodiment", "an embodiment", or "an example" of the present disclosure are not intended to be interpreted as excluding the existence of additional embodiments or examples that also incorporate the recited features. For example, any element described in relation to an embodiment herein may be combinable with any element of any other embodiment described herein.

Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

Although various example embodiments have been described in detail herein, those skilled in the art will readily appreciate in view of the present disclosure that many modifications are possible in the example embodiments without materially departing from the present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. All claims and exhibits are incorporated herein. Any described features from the various embodiments disclosed and incorporated may be employed in combination.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke means plus function type claiming for any limitations of any of the claims herein, except for those in which the claim expressly uses the words 'means for' together with an associated function.

The Abstract at the end of this disclosure is provided to allow the reader to quickly ascertain the general nature of some embodiments of the present disclosure. It is submitted with the understanding that it will not be used to interpret or limit the scope or meaning of the claims.

What is claimed is:

1. A method of making luminescent diamond consisting of:

subjecting a volume of precursor diamond grains to high-pressure/high-temperature conditions in a pressure cell and thereby forming diamond grains with luminescent centers, wherein the high-pressure/high-temperature conditions are from about 1300° C. to about 2500° C. and from about 3.0 GPa to about 10 GPa;

forming a suspension by suspending the diamond grains in a liquid;

adhering the suspension to a substrate and controlling a thickness of the suspension on the substrate;

heat treating the suspension on the substrate at a temperature not exceeding 650° C., thereby changing oxygen terminations on diamond particles of the suspension and increasing a photoluminescence intensity of the diamond grains; and removing the diamond particles from the substrate and separating the removed diamond particles by grain size.

2. The method of claim 1, wherein the luminescent centers include at least one of nitrogen or silicon vacancies.

3. The method of claim 1, wherein the liquid includes water.

4. The method of claim 3, wherein the liquid includes a surface tension suppressant.

5. The method of claim 4, wherein the surface tension suppressant includes alcohol.

6. The method of claim 1, wherein the liquid is 10% to 100% alcohol by weight.

7. The method of claim 1, wherein the substrate is glass.

8. The method of claim 1, wherein the thickness is controlled to be less than 30 μm.

9. The method of claim 8, wherein the thickness is controlled to be less than 25 μm.

10. The method of claim 8, wherein the thickness is controlled to be between 1 μm and 15 μm.

11. The method of claim 1, wherein controlling the thickness includes removing material that exceeds a threshold thickness.

12. The method of claim 1, wherein adhering the suspension to the substrate includes drying the suspension.

13. The method of claim 12, wherein drying the suspension is performed at a temperature below a boiling point of the liquid and before heat treating the suspension.

14. The method of claim 1, wherein adhering the suspension to the substrate includes coating the suspension on the substrate using one or more of dip coating, spin coating, dry coating, or slip casting.

15. The method of claim 1, wherein heat treating the suspension includes heat treating at a temperature not exceeding 600° C.

16. The method of claim 1, wherein heat treating the suspension includes heat treating at a temperature not exceeding 550° C.

17. The method of claim 1, wherein heat treating the suspension is performed for a duration of up to two hours.

18. The method of claim 1, wherein heat treating the suspension is performed for a duration of between 30 minutes and 90 minutes.

19. The method of claim 1, wherein the pressure cell is configured to impose a differential or asymmetric pressure on the precursor diamond grains.

20. The method of claim 1, wherein:

the volume of precursor diamond grains is formed by consolidating and compacting a volume of pre-existing diamond grains; and the volume of precursor diamond grains comprises intercrystalline diamond bonding.

21. The method of claim 1, wherein:

the volume of precursor diamond grains is formed by consolidating and compacting a volume of pre-existing diamond grains; and the volume of precursor diamond grains does not comprise intercrystalline diamond bonding.

22. A method of making luminescent diamond consisting of:

subjecting a volume of natural precursor diamond grains with an average grain size of from 10 μm to 50 μm to high-pressure/high-temperature conditions in a pressure cell and thereby forming diamond grains with luminescent centers, wherein the high-pressure/high-temperature conditions are from about 1300° C. to about 2500° C. and from about 3.0 GPa to about 10 GPa;

forming a suspension by separating the diamond grains into a powder and suspending the diamond grains in water;

adhering the suspension to a glass substrate and controlling a thickness of the suspension on the substrate to be from 5 μm to 15 μm, wherein the diamond grains have a concentration of from 0.1% to 10% by weight in the suspension;

heat treating the suspension on the substrate at a temperature in a range between 450° C. and 550° C. for 60 minutes, thereby changing at least one of a color of the suspension or oxygen terminations on diamond particles of the suspension and increasing a photoluminescence intensity of the diamond grains; and removing the diamond particles from the substrate and separating the removed diamond particles by grain size, wherein the pressure cell is configured to impose a differential or asymmetric pressure on the precursor diamond grains in order to plastically deform the precursor diamond grains and produce the luminescent centers in the diamond grains.

* * * * *